Figure 1:
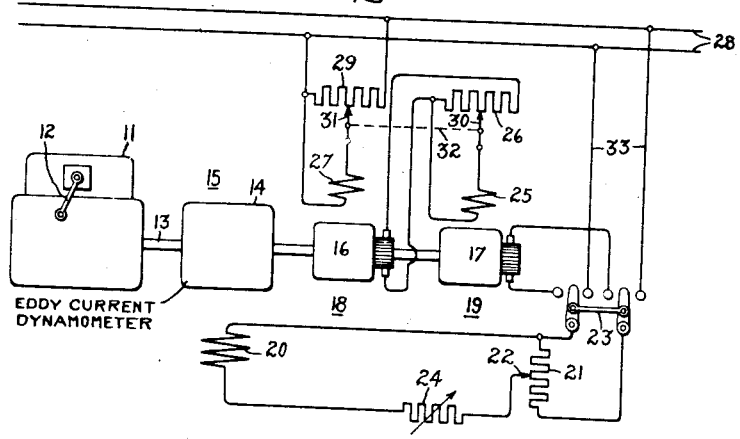

Oct. 13, 1942.   K. R. McDOUGAL   2,298,894
ELECTRIC DYNAMOMETER
Filed Sept. 4, 1940

Inventor:
Kenneth R. McDougal,
by Harry E. Dunham
His Attorney.

UNITED STATES PATENT OFFICE 2,298,894

ELECTRIC DYNAMOMETER

Kenneth R. McDougal, Fort Wayne, Ind., assignor to General Electric Company, a corporation of New York Application September 4, 1940, Serial No. 355,323

5 Claims. (Cl. 73—51)

This invention relates to an electric dynamometer and more particularly to electric dynamometers employed for use as power absorption devices in loading and measuring the load of prime movers shuch as internal combustion engines and the like.

It is an object of my invention to provide an improved automatic dynamometer control system.

It is another object of my invention to provide an improved excitation system for an electric dynamometer whereby a load of a predetermined torque-speed characteristic may be imposed upon a prime mover for simulating an airplane propeller load or other types of propeller loads.

It is a further object of my invention to provide an improved electrical dynamometer whereby the power absorbed may automatically be made to vary approximately as the cube of the speed.

Other and further objects and advantages will become apparent as the description proceeds.

In order to simulate in the laboratory the conditions of actual service, such as a propeller load driven by an internal combustion engine, it is desirable to provide an excitation system for a dynamometer employed in loading the engine which automatically will maintain with varying loads the desired power-speed relationship. In carrying out my invention in its preferred form, a pair of direct current exciter generators which are driven at a speed proportional to the dynamometer are employed for exciting the dynamometer field. One of these exciters has its armature connected to the field of the dynamometer while its field is connected to the armature of the other exciter generator. The other exciter may be excited either from a constant voltage source of supply or by means of a permanent magnet. The exciter whose armature is connected to the dynamometer field is operated in the unsaturated condition. Consequently, the excitation supplied to the dynamometer varies in accordance with the square of the speed, and for operation under the saturation point on the dynamometer, a torque will be developed which likewise varies as the square of the speed. It will thus be seen that the horsepower load imposed by the dynamometer will vary approximately as the cube of the speed. This arrangement provides a convenient means whereby the prime mover or internal combustion engine to be tested is automatically loaded with a load whose characteristics vary as the cube of the speed of the dynamometer which is driven by the engine under test.

In a modification the output of the exciter is connected to the input of a dynamo-electric amplifier instead of being directly connected to the dynamometer field. Such an arrangement permits the employment of smaller exciters so that they need not be cradled with the main dynamometer.

Figure 2:
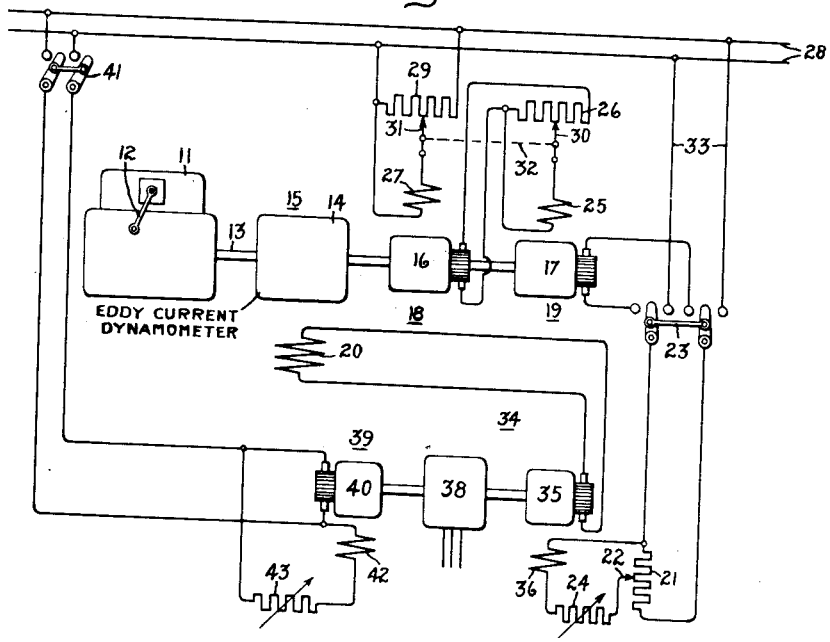
Figure 3:
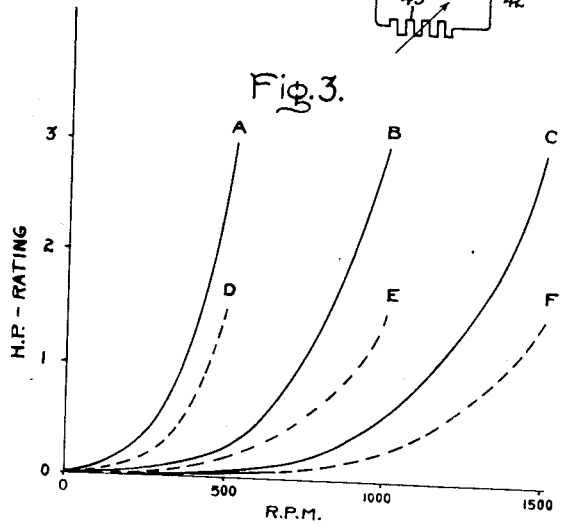

The novel features which are characteristic of my invention are set forth with particularity in the appended claims. My invention, however, both as to its organization and its method of operation will be better understood with reference to the following description when considered in connection with the accompanying drawing in which Fig. 1 is a schematic electric circuit diagram of apparatus arranged in accordance with my invention; Fig. 2 is a modification of the arrangement of Fig. 1; and Fig. 3 illustrates several characteristic curves which will be employed in explaining my invention.

Referring to Fig. 1 of the drawing, the numeral 11 represents a prime mover in the form of an internal combustion engine having a throttle 12 and mechanically connected by means of a rotary shaft 13 to the rotor 14 of a dynamometer 15, for example of the inductor eddy current type. Connected also to the shaft 13, or arranged to be driven at a speed proportional thereto, are the rotors or armatures 16 and 17 of a pair of direct current exciter generators 18 and 19. The dynamometer 15 is provided with a field winding 20 which is adapted to be excited by the armature 17 of the exciter 19 and controlled by a potentiometer type rheostat 21 having an adjustable tap or contact 22. The armature 17 of the exciter 19 is adapted to be connected to the rheostat 21 through a double-pole-double-throw switch 23 the purpose of which will be later explained. A vernier rheostat 24 may also be included in the circuit of the field winding 20. The potentiometer rheostat 21 and the vernier 24 serve to control the actual amount of load or excitation where manual control is desired to obtain the exact load setting. The generator 19 will be of sufficient capacity to excite the dynamometer 15 and designed to operate on the straight portion of its saturation curve. The exciter generator 19 is provided with the usual field winding 25 which is shown connected to the armature 16 of the smaller pilot exciter 18 through a potentiometer type rheostat 26. The foregoing arrangement is preferred but it will be appreciated that the armature 16 may be connected to the field winding 25 through a series rheostat if desired.

The exciter generator 18 is provided with a field winding 27 which is supplied with a direct current from a separate source 28. A suitable arrangement, such as a potentiometer type rheostat 29 provides means for supplying the field 27 with any desired uniform excitation. The movable contacts 30 and 31 of the rheostats 26 and 29, respectively, may be operated independently but I prefer to operate them in tandem or simultaneously from a common control member as illustrated at 32. These rheostats may be of the slide-wire type or they may be of the rotary type in which case the control member 32 conveniently may be operated by a suitable hand wheel. The resistor 21 which is connected to the field circuit of the dynamometer may be alternatively connected to the constant voltage supply source 28 by means of the double-pole, double-throw switch 23 and conductors 33. The dynamometer 15 may be provided with the customary scale beam to form a conventional "cradle" type dynamometer. It will also be appreciated that other types of dynamometers may be employed in carrying out the principles of my invention together with other means of measuring the power absorbed.

The arrangement of Fig. 2 is quite similar to that of Fig. 1 but differs primarily in the insertion of an amplifier 34 between the armature 17 of the exciter 19 and the field winding 20 of the dynamometer. In the illustrated embodiment I have shown an amplifier of the dynamo-electric type comprising a conventional direct current generator—designed to operate on the straight portion of its saturation curve—having an armature 35 and a field winding 36 and a suitable constant speed motor 38, preferably of the synchronous or induction type, for driving the armature 35.

Since the direct current generator is operated in the unsaturated condition and has its armature 35 driven at a constant speed, it delivers a voltage to the dynamometer field 20 which is proportional to the excitation which is supplied to its field or input circuit 36. This generator may be replaced by a direct current machine of the armature reaction-excited type, such for example, as that disclosed and claimed in a copending application of E. F. W. Alexanderson and M. A. Edwards, Serial No. 281,008, filed June 24, 1939, and which is assigned to the assignee of the present invention. Furthermore, an electronic amplifier may be employed in lieu of the dynamo-electric type, if desired.

As indicated previously, the pilot exciters 16 and 17 of the foregoing arrangements may or may not be cradled with the dynamometer, depending upon the required size of the exciter. When these pilot exciters are of such small size in comparison to the size of the dynamometer that the torque required to drive them is negligible, these units need not be cradled. Hence, by the employment of an amplifier, such as 34, for the output of exciter 19, small pilot exciter may be used and thus avoid the expense and inconvenience of mounting the exciters in a manner to ascertain their load requirements.

In cases where no separate source of direct current is available, I may provide a self-excited direct current generator 39 which conveniently may be driven by the motor 38 of the amplifier. The armature 40 may be electrically connected to the line 28 through a switch 41 for supplying the necessary direct current. The field winding 42 is shown connected across the armature through an adjustable rheostat 43.

The exciting field 27 with adjustable rheostat or potentiometer 29 may be omitted from the first pilot exciter 18 and a permanent magnet field may be substituted. This arrangement simplifies the control and in some cases may eliminate the necessity for a separate constant direct current source of supply. Such a system may be used conveniently where the speed range is not excessively large so as to necessitate an additional adjustment in the excitation of exciter 18 for voltage protection. If the speed of the dynamometer and exciters is to vary over a wide range, however, both adjustable rheostats 26 and 29 are provided in order to prevent excessive voltages on the pilot exciters. These rheostats may be operated independently or they may be connected for operation from a common operating member as already explained.

In operation, assume that the switch 23 of Fig. 1 is thrown to the left position to connect the armature 17 of the exciter 19 across the rheostat 21. The first exciter 18 receives its excitation from the constant direct current source 28 and this excitation may be adjusted by the rheostat 29. The second exciter 19 receives its excitation from the armature 16 of the first exciter 18, which excitation may also be adjusted by the rheostat 26. The excitation delivered to exciter 19 through its field winding 25 increases proportional to the speed of exciter 18 since the latter has constant excitation applied to its field.

Since exciter 19 is also driven at a speed proportional to that of the dynamometer, the voltage delivered by this exciter would normally increase in proportion to the speed with constant excitation applied to its field, but inasmuch as the excitation is increasing in accordance with the speed the voltage output at its armature 17 increases more rapidly. It will thus be seen that if the exciter 19, as in the instant case, is designed so that it operates in the unsaturated condition or on the straight portion of its saturation curve, the output voltage from this exciter will then increase approximately as the square of the dynamometer and exciter speeds. In the apparatus disclosed in Fig. 1, this voltage is applied to the field 20 of the dynamometer directly through the potentiometer 21 and the vernier 24; while in the apparatus illustrated in Fig. 2, the voltage from the exciter 19 is connected to the input circuit of the linear-response amplifier 34, the output of the amplifier being connected to the dynamometer field 20. Inasmuch as the excitation system delivers a voltage which is approximately proportional to the square of the dynamometer speed, the dynamometer torque due to this excitation will be approximately proportional to the square of the speed so that the horsepower absorption of the dynamometer increases approximately proportional to the cube of the speed.

In order more fully to explain the operation and manner of adjustment of the system, Fig. 3 has been presented to show typical curves obtainable with my automatic excitation system. These curves have been drawn with purely arbitrary units of horsepower and speed ranges, but with the horsepower increasing as the cube of the speed. For example, these horsepower units may be multiplied by a factor such as 100, 1000, etc., for actual conditions. Assuming that the particular dynamometer be rated 3 units of horsepower at a base speed of 500 R. P. M., the design of the pilot exciter 19 will be such that it will deliver full excitation to the dynamometer field 20 at 500 R. P. M. or so that it will deliver full excitation at this same speed to the field of the direct current machine which is included in the amplifier 34 of Fig. 2, as the case may be. It follows therefore that, with the adjustable potentiometers 29, 26, and 21 set at near their respective maximum positions, the system will automatically supply excitation such that the load on the dynamometer will increase according to curve OA. To reduce the load to 50% of this value at any point, or to some other desired percentage, it is necessary to make the proper adjustment of potentiometer 21 and obtain a curve such as OD, automatically as the speed changes without further adjustment of any of the potentiometers.

Let it now be assumed that it is desired to obtain a curve such as OB. The potentiometer rheostats 29 and 26 are adjusted to a predetermined setting as marked on the dial, indicating the maximum speed to be 1000 R. P. M. In this case normal excitation voltage will be delivered at approximately 1000 R. P. M. and excessive voltage will be prevented by such setting of the potentiometers. Again by a proper setting of the potentiometer 21, a curve such as OE may be obtained automatically as the speed changes without any further adjustment of the potentiometers. Similarly, curve OC may be obtained by setting potentiometers 29 and 26 at a new point on the dial marked for 1500 R. P. M. maximum speed, which setting again prevents excessive voltages when operating up to 1500 R. P. M. maximum speed.

In describing the operation of the arrangements of Figs. 1 and 2, the switch 23 was assumed to be thrown to the left to connect the dynamometer field with the armature 17 to exciter 19 for automatic operation. At times it is desired to use manual control and eliminate the effects of the automatic excitation completely, that is, to secure excitation for the dynamometer which is independent of speed changes. For such operation the double-pole-double-throw switch 23 is thrown to the right to connect the exciting field winding 20 of the dynamometer in Fig. 1, or the input circuit 36 of the amplifier in Fig. 2, to the constant voltage direct current source of supply 28, and in this way the system operates with conventional constant excitation, which can be adjusted by the potentiometer rheostat 21 and vernier 24 to obtain the desired load. This connection also serves the additional purpose of permitting maximum excitation at any speed down to zero on the dynamometer, thereby permitting maximum available torque to be obtained on the dynamometer even at low speeds.

I have thus provided an improved automatic excitation system which delivers a voltage which is substantially proportional to the square of the dynamometer speed, thereby resulting in a dynamometer torque due to this excitation which is approximately proportional to the square of the speed or a horsepower absorption which increases approximately proportional to the cube of the speed. The apparatus is thus adapted for obtaining on the dynamometer torque and horsepower against speed relationships for simulating in the laboratory various types of propeller loads. Such a system has the advantage that it provides an operating characteristic similar to that found in actual practice from the standpoint of stability and control. Such a characteristic enables the operator to increase the speed of the engine or prime mover with the load approximately at the desired point without appreciable adjustment, since the increase in load with increase in speed is automatic.

In accordance with the provisions of the patent statutes, I have described the principle of operation of my invention together with the apparatus which I now consider to represent the best embodiments thereof but I desire to have it understood that the apparatus shown is merely illustrative and that the invention may be carried out by other means.

What I claim as new and desire to secure by Letters Patent of the United States is:

1. In combination in a system for testing prime movers, an electric dynamometer comprising field producing means and a rotary element adapted to be coupled to the prime mover to be tested for placing a load of controllable speed-horsepower characteristics on said prime mover, a first direct current generator having field and armature windings and driven at a speed proportional to the dynamometer, means for exciting said dynamometer field producing means in accordance with armature voltage variations of said first generator, a second direct current generator having field and armature windings and driven at a speed proportional to the dynamometer, means for exciting said field winding of said first generator in accordance with armature voltage variations of said second generator, and means connecting said field winding of said second generator to a separate direct current source of supply.

2. In combination in a device for testing a mechanism power source, an electric dynamometer for placing a load of controllable speed-horsepower characteristics on said mechanical source, said dynamometer including a rotary element to be connected to said power source, magnetic field producing means for controlling the torque-absorbing capacity of said dynamometer, a first exciter generator having an armature driven at a speed proportional to the speed of said dynamometer, said first exciter generator having a field winding for controlling the voltage of said exciter generator corresponding to a given speed, means for connecting said exciter generator armature to said magnetic field producing means for energizing said latter means, a second exciter generator having an armature driven at a speed proportional to the speed of said dynamometer, said second exciter generator having a field winding for controlling the voltage output in the armature of said second exciter generator corresponding to a given speed, means connecting said field winding of said first exciter generator in circuit with said armature of said second exciter generator, means connecting said field winding of said second exciter generator to a substantially constant voltage source of supply, a field rheostat in circuit with said field winding of said first exciter generator, a field rheostat in circuit with said field winding of said second exciter generator, and means connecting said field rheostats for simultaneous control.

3. In a device for loading prime movers, an electric dynamometer having a rotary member adapted to be connected to a prime mover to be tested and having a field winding for controlling its speed-torque characteristics, a first exciter generator having a field winding and an armature, said armature being driven at a speed proportional to said prime mover, means connecting said field winding of said dynamometer to be excited in accordance with armature voltage variations of said first exciter generator, a second exciter generator having an armature driven at a speed proportional to said prime mover speed, said second exciter generator being adapted to generate a voltage which varies in accordance with said speed, and means connecting said field winding of said first exciter generator to said armature of said second exciter generator, said first exciter generator being operated in the unsaturated condition whereby its armature voltage varies substantially as the square of the speed of said prime mover, and said dynamometer being operated in the substantially unsaturated condition whereby its torque varies substantially as to maintain automatically a horsepower load on said prime mover which varies substantially as the cube of the speed.

4. In combination in a system for testing prime movers, an electric dynamometer comprising field producing means and a rotary element adapted to be connected to a prime mover to be tested for placing a load of controllable speed-torque characteristics on said prime mover, an amplifier having input and output circuits, means connecting said field producing means of said dynamometer in the output circuit of said amplifier, a first exciter generator having an armature driven at a speed proportional to said prime mover, a field exciting winding for said first exciter generator, a second exciter generator having an armature driven at a speed proportional to said prime mover, a field exciting winding for said second exciter generator, means connecting said field winding of said first exciter generator in circuit with said armature of said second exciter generator, exciting means for said second exciter generator, said first exciter generator being operated in the unsaturated condition, said amplifier having a substantially linear response between its input and output circuits, and means connecting said armature of said first exciter generator to the input circuit of said amplifier.

5. In a device for loading prime movers, an electric dynamometer having a rotary member adapted to be connected to a prime mover to be tested and having a field winding for controlling its speed-torque characteristics, an amplifier having input and output circuits and having a substantially linear response, a first exciter generator having an armature driven at a speed proportional to the speed of the prime mover to be tested, a field exciting winding for said first exciter generator, means connecting said field winding of said dynamometer in the output circuit of said amplifier, a second exciter generator having an armature driven at a speed proportional to the speed of the prime mover to be tested, a field exciting winding for said second exciter generator, means connecting said field winding of said first exciter generator to said armature of said second exciter generator, a substantially constant voltage source of supply, means connecting said field winding of said second exciter generator to said constant voltage source of supply, a first field control means in circuit with said field exciting winding of said first exciter generator, a second field control means in circuit with said field exciting winding of said second exciter generator, means connecting said first and second control means for simultaneous operation, and means connecting said armature of said first exciter generator to the input circuit of said amplifier, said first exciter generator being operated in a substantially unsaturated condition whereby the excitation supplied to said dynamometer varies substantially as the square of the speed.

KENNETH R. McDOUGAL.

CERTIFICATE OF CORRECTION.

Patent 2,298,894. October 13, 1942.

KENNETH R. McDOUGAL.

It is hereby certified that error appears in the printed specification of the above numbered patent requiring correction as follows: Page 1, first column, line 5, for "shuch" read --such--; page 2, first column, line 4, strike out "a" before "direct"; page 3, first column, line 41, for "to" before "exciter" read --of--; and second column, line 38, claim 2, for "mechanism" read --mechanical--; page 4, first column, line 17, claim 3, after "as" insert --the excitation thereof--; and that the said Letters Patent should be read with this correction therein that the same may conform to the record of the case in the Patent Office.

Signed and sealed this 1st day of December, A. D. 1942.

(Seal)

Henry Van Arsdale,
Acting Commissioner of Patents.